United States Patent
Yen

(10) Patent No.: US 7,374,790 B2
(45) Date of Patent: May 20, 2008

(54) METHOD OF PROCESSING GRANULATED SOFT-SHELLED TURTLE EGGS

(76) Inventor: Tieh-Ken Yen, PMB#1008, 1867 Ygnacio Valley Rd., Walnut Creek, CA (US) 94958

( * ) Notice: Subject to any disclaimer, the term of this patent is extended or adjusted under 35 U.S.C. 154(b) by 730 days.

(21) Appl. No.: 10/913,402

(22) Filed: Aug. 9, 2004

(65) Prior Publication Data
US 2006/0029717 A1 Feb. 9, 2006

(51) Int. Cl.
*A23L 1/32* (2006.01)
(52) U.S. Cl. ............... 426/614; 426/518; 426/643; 426/489; 426/444
(58) Field of Classification Search ........... 426/614, 426/518, 643, 489, 444
See application file for complete search history.

(56) References Cited

U.S. PATENT DOCUMENTS 6,358,554 B1 * 3/2002 Hagiwara et al. ........... 426/614

FOREIGN PATENT DOCUMENTS

| JP | 58-134967 | * | 8/1983 |
| JP | 63-12245 | * | 1/1988 |

* cited by examiner

Primary Examiner—Anthony Weier
(74) Attorney, Agent, or Firm—Leong C. Lei

(57) ABSTRACT

A method to process soft-shelled turtle eggs into fine granules by rinsing and removing foreign matter from eggs, blending eggshells, and egg white and egg yolk; then having the harder eggshells separated from the softer mixture of egg white and yolk, and frozen to be separately ground before having granules of eggshells mixed with that of egg white and yolk ground once again into fine granules of final product.

3 Claims, 2 Drawing Sheets

METHOD OF PROCESSING GRANULATED SOFT-SHELLED TURTLE EGGS

BACKGROUND OF THE INVENTION (a) Technical Field of the Invention

The present invention is related to a granulation process of soft-shelled turtle eggs, and more particularly, to one that separates the hard eggshell and the soft egg yolk and egg white to be ground separately and then mix for further grinding and consistently mixed to achieve the fine granules of final product for better meeting the mouth and absorption of nutrients by human intestines.

(b) Description of the Prior Art

Eggs of soft-shelled turtle are believed to contain abundant nutrients. The shell, meat, and even eggs of the soft-shelled turtle have been already completely exploited in the orient. Whether they are cooked alone or added into oriental recipes, soft-shell turtle eggs help maintain one's good health.

Either consumed raw, or soaked into liquor for a certain period of time before being consumed, eggs of soft-shelled turtle can be processed into granules similar to power to facilitate oral taking. Soft-shelled turtle eggs in granules may be added with other natural food to reduce its offensive smell to be more acceptable by both of the adults and kids. Nonetheless, the soft-shelled turtle eggs are best consumed in the form of granules for the human intestines to fully absorb nutrients in the eggs.

In the prior art, eggs of soft-shelled turtle are rinsed, frozen and dehydrated to solidify egg white and yolk before being put into high-speed grinder by rotation. However, harder shells are also ground together with the softer egg white and yolk at the same time. Even having been solidified, egg white and yolk return to their liquid state when heated up by the thermal energy produced in the process of grinding at high speed. Accordingly, as the grinding process continues, shells are mixed with egg white and yolk to prevent shells from being ground into fine granules. It can be easily understood that either the hard shells or the softer egg white and yolk can not be consistently ground into the grain size as desired when both are mixed together for grinding. Therefore, residual larger granules from the shells are found in the final product making it awkward in meeting the mouth while preventing it from being well absorbed by human body.

Egg yolk of the soft-shelled turtle like that found with the ordinary eggs of chicken or duck contains certain fat, which serves as a natural lubricant. When shells of the soft-shelled turtle are crushed in the grinding process, the fat is released and gets accumulated to further prevent them from being ground to the grain size as desired and the soft nature of egg white and yolk further make the grinding process more difficult. Even the repeated grinding process fails to overcome the problem that certain parts of the shells are so stubborn to be ground into the grain size as desired.

To maintain the abundant nutrients contained in the eggs of the soft-shelled turtle and to solve the problem encountered in the grinding process, traders in the industry have been trying very hard to find a solution for consistently grinding both of the harder shells and the softer egg white and yolk into final product in grain size as desired.

SUMMARY OF THE INVENTION

The primary purpose of the present invention is to provide a process to grind eggs of the soft-shelled turtle into fine granules in desirable grain size. To achieve the purpose, eggs are rinsed, blended and having the harder shells separated from the softer egg white and yolk, then respectively frozen and dried to be separately ground.

Another purpose of the present invention is to provide a process to grind eggs of the soft-shelled turtle into fine granules in desirable grain size. To achieve the purpose, the shells are frozen, dried, and ground alone at high speed into fine granules.

Yet another purpose of the present invention is to provide a process to grind eggs of the soft-shelled turtle into fine granules in desirable grain size. To achieve the purpose, egg white and egg yolk are frozen, dried and ground first at lower speed before advancing to higher speed into fine granules.

Yet another purpose of the present invention is to provide a process to grind eggs of the soft-shelled turtle into fine granules in desirable grain size. To achieve the purpose, the ground shells and the ground egg white and yolk are mixed to be further ground into fine granules in consistent grain size without residual granules in larger size to easily meet the mouth and digested.

Still another purpose of the present invention is to provide a process to grind eggs of the soft-shelled turtle into fine granules in desirable grain size. Eggs are first separated before being respectively ground into fine granules for their nutrients to be better absorbed by human intestines.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
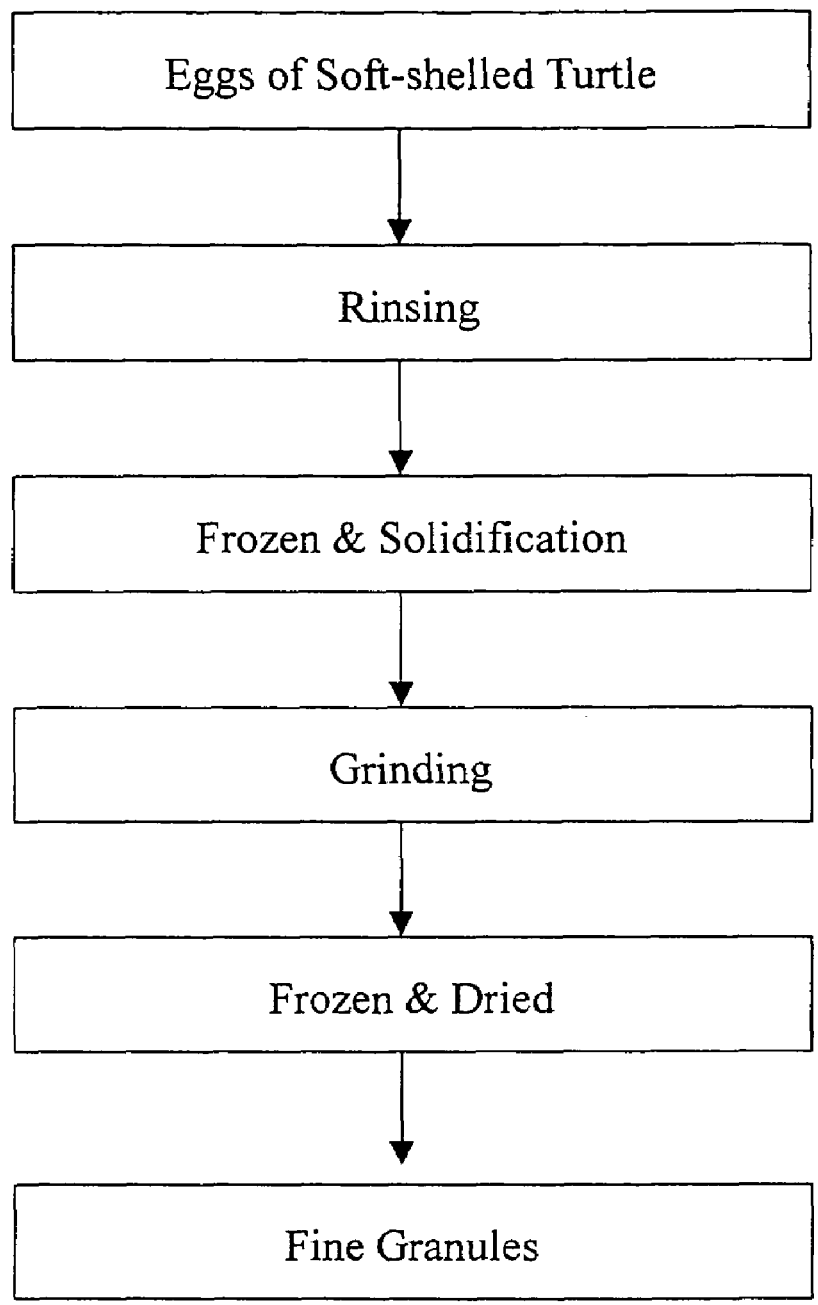
FIG. 1 is a schematic view showing the process of the prior art for the making of powder of soft-shelled turtle eggs.
Figure 2:
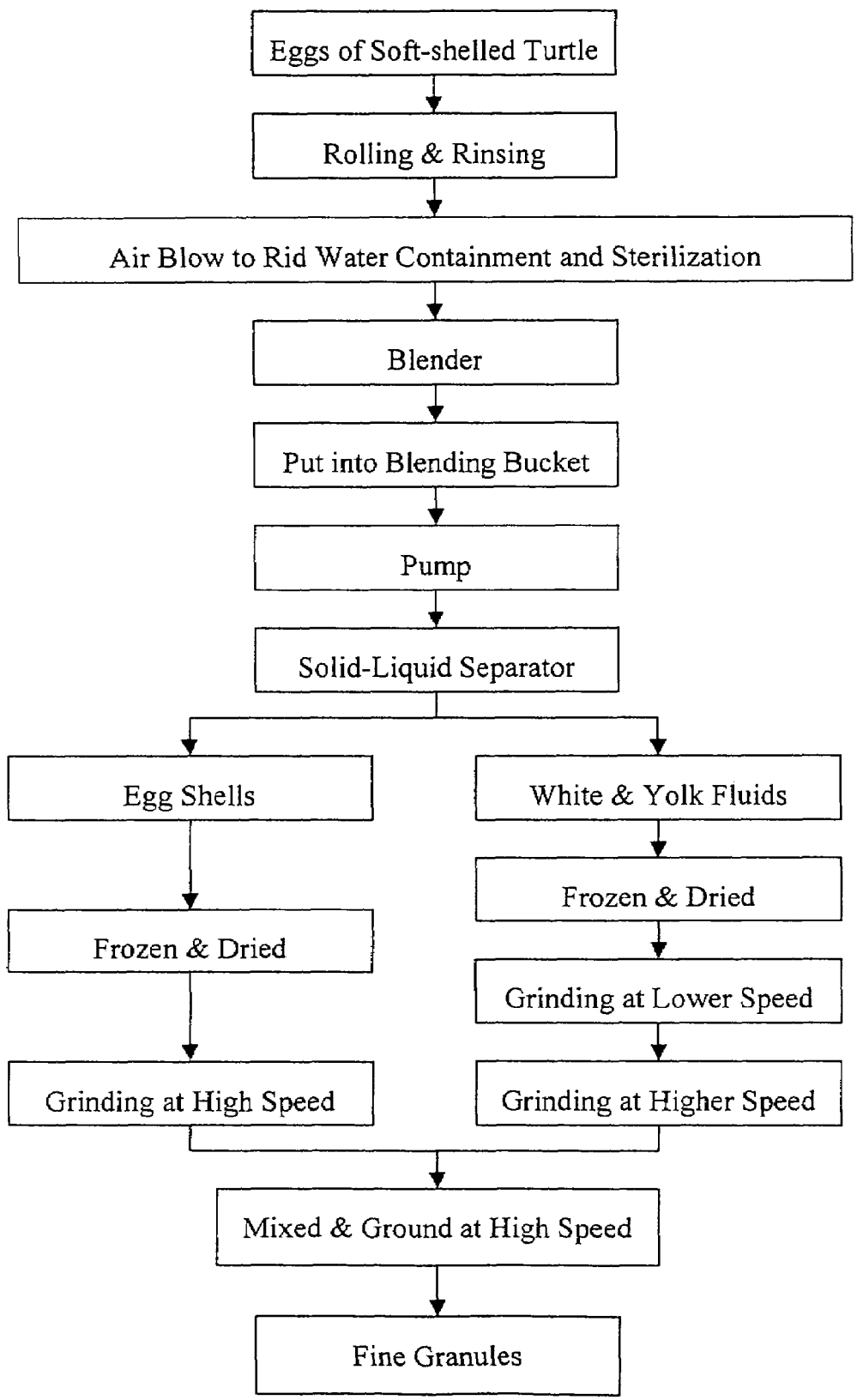
FIG. 2 is a schematic view showing the process flow chart of the present invention.

Referring to FIG. 2, the process for making soft-shelled turtle eggs into fine granules has first the eggs rolled and rinsed, air blown to remove water containment on the shells. Eggs are put into a blender to crush their shells and placed into a blending bucket to mix egg white, egg yolk and shells.

The mixture is pumped into a solid-liquid separator to separate the harder eggshells from the softer egg white and yolk in liquid state.

Eggshells are put into a container, and egg white and yolk are put into another container to be frozen and dried. Both containers are placed into a freezer for dehydration. Wherein, small parts of residual white may be found on the eggshells. The yolk as the least portion of the egg less for containing fat has been separated from eggshell due to eccentric force at high speed in the separator. Therefore, egg white, if any, staying with the eggshell is solidified together with the eggshell. As for the egg white and yolk in another container, they having been already consistently mixed in the separator are less likely to absorb any water containment when frozen and dried into a complete mass to facilitate the subsequent grinding process.

In the next step, the frozen and solid eggshells are put into a grinder to be ground at high speed into fine granules. Meanwhile, the frozen and solid egg white and yolk are ground first at lower speed into smaller pieces, and then ground at higher speed into consistently mixed fine granules.

Eggshells in fine granules are mixed with granules of egg white and yolk for final grinding at high speed to achieve the optimal mixing and grinding results for granules of eggshells, egg white and yolk.

Whereas eggshells are ground alone before being mixed with egg white and yolk that are ground separately from the eggshells for further grinding, the finest grinding result can be achieved to eliminate the problem of creating larger grain size of the granules found in the prior art. Furthermore, nutrients of eggs can be evenly distributed among all the granules to significantly help the food process of soft-shelled turtle eggs.

In the present invention, the harder eggshells and the mixture of egg white and yolk are first separated for giving a primary grinding before all three compositions are mixed together for a secondary grinding. The granules of the final product is finest for easy absorption by the human intestines, thus to help maintain good health of human body in a more efficient way.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A method to process soft-shelled turtle eggs into fine granules by having eggs rolled and rinsed, removing water containment on eggshell using a air blower, crushed in a blender, mixed with egg white and yolk in liquid state in a blender; fluid then poured into a solid-liquid separator; the eggshells and mixture of the egg white and yolk being separately frozen, dried and ground into fine granules; and finally granules of eggshells and that of egg white and yolk being mixed and ground again into fine granules of final product.

2. The method to process soft-shelled turtle eggs into fine granules of claim 1, wherein, the eggshells when solidified are forthwith ground at high speed into fine granules.

3. The method to process soft-shelled turtle eggs into fine granules of claim 1, wherein, the mixture of egg white and yolk when solidified are ground first at lower speed and further ground at higher speed into consistently mixed granules.

* * * * *